United States Patent [19]

Isomura et al.

[11] Patent Number: 4,748,613
[45] Date of Patent: May 31, 1988

[54] DISC RECORDING APPARATUS PROVIDED WITH A MECHANISM FOR MOVING THE HEAD-CARRIAGE BY MEANS OF A METALLIC BELT

[75] Inventors: Akihiro Isomura; Chikahisa Kawakami, both of Ohme, Japan

[73] Assignee: Kabushiki Kaisha Toshiba, Kawasaki, Japan

[21] Appl. No.: 889,757

[22] Filed: Jul. 28, 1986

[30] Foreign Application Priority Data

Jul. 29, 1985 [JP] Japan .................................. 60-165726

[51] Int. Cl.⁴ .......................... G11B 5/56; F16H 21/44
[52] U.S. Cl. ..................................... 369/215; 74/89.2; 360/106; 369/219
[58] Field of Search ............... 369/215, 219, 220, 221; 360/106, 107; 74/89.2

[56] References Cited

U.S. PATENT DOCUMENTS

| | | | |
|---|---|---|---|
| 4,161,004 | 7/1979 | Dalziel ................................. | 360/106 |
| 4,537,084 | 8/1985 | Passemard et al. .................. | 74/89.2 |
| 4,577,521 | 3/1986 | Takikawa .............................. | 74/89.2 |

Primary Examiner—Steven L. Stephan
Attorney, Agent, or Firm—Finnegan, Henderson, Farabow, Garrett and Dunner

[57] ABSTRACT

A disc recording apparatus in which it is possible to temporarily secure a metallic belt to a metallic belt attachment plate in a condition in which metallic belt is curved in an α-like shape, and therefore, step of curving metallic belt, after head carriage is assembled to frame, which has been conventionally required, can be eliminated.

9 Claims, 2 Drawing Sheets

DISC RECORDING APPARATUS PROVIDED WITH A MECHANISM FOR MOVING THE HEAD-CARRIAGE BY MEANS OF A METALLIC BELT

The present application claims priority of Japanese patent application Ser. No. 60-165726 filed on July 29, 1985.

FIELD OF THE INVENTION AND RELATED ART STATEMENT

The present invention relates to disc recording apparatus such as floppy disc or hard disc apparatus, optical recording disc apparatus, etc., provided with a mechanism for moving a head carriage by means of a metallic belt.

Disc recording apparatus such as floppy or hard disc apparatus in which a head is moved radially on a disc to write or read recorded information to and from the disc, generally utilize a stepping motor as a drive source for moving the head. Further, as a mechanism for transmission of power from the stepping motor to a carriage on which the head is attached, a mechanism in wide use is a metallic belt attached to the shaft of the stepping motor and fixed to the carriage.

Generally, the metallic belt is made of stainless steel but other materials can be used as the material with a high tensile strength and are flexible.

Conventionally, the attachment of the matallic belt to the stepping motor has been made by the method shown in FIGS. 3A through 3D.

Referring to FIG. 3A, stepping motor 2 is attached to frame 1 at a predetermined position.

Then, metallic belt 4 having one end joined thereto with attachment member 3 is secured at the other end to metallic belt attachment plate 5 which is in turn attached to head carriage 6, and as shown in FIG. 3B, head carriage 6 is mounted to frame 1, and is movable in the direction of arrow A.

Referring to FIG. 3C, metallic belt 4 is curved in an α-like shape and wound around pulley 7, attached to shaft 2a of stepping motor 2.

Further, as shown in FIG. 3D, attachment hardware 3 is secured by a screw to metallic belt attachment plate 5 while attachment member 3 is pulled in the direction of arrow B in order to provide tension for metallic belt 4.

FIG. 4 shows the arrangement in the vicinity of the metallic belt attachment hardware in a conventional disc recording apparatus.

As can been clearly seen in this figure, there are formed, in attachment hardware 3, which is joined to one end of metallic belt 4, hole 9, which corresponds to threaded hole 8 in metallic belt attachment plate 5, and hole 10 to which a tension applying device is attached. Further, mounting attachment member 3 is separable from metallic belt attachment plate 5.

However, in the above-mentioned method, the winding of metallic belt 4 around shaft 2a (or pulley 7) is complicated, and therefore, automation of this step is difficult to achieve.

That is, since the metallic belt must curve in a narrow space and in an unstable carriage condition, proper operation has been extremely difficult to achieve.

OBJECT AND SUMMARY OF THE INVENTION

The present invention has been developed in view of the problems mentioned above, and therefore, the object of the present invention is to provide a disc recording apparatus in which the metallic belt can be attached to the shaft of the motor using a very simple method, and therefore, automation of production can be promoted.

The disc recording apparatus, according to the present invention, allows a metallic belt to be temporarily fastened to the metallic belt attachment plate, secured to the head carriage in the condition in which the metallic belt is curved into an α-like shape.

BRIEF DESCRIPITON OF THE DRAWINGS

DETAILED DESCRIPTION OF THE PREFERRED EMBODIMENTS

An embodiment form of the present invention will now be explained in more detail with reference to the accompanying drawings.

Figure 1:
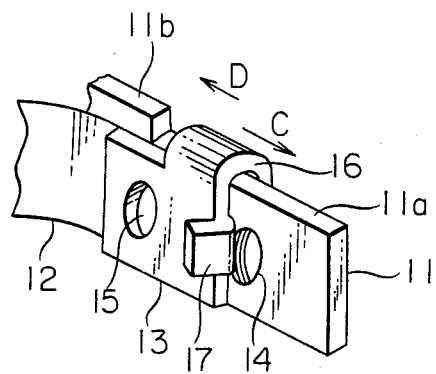
FIG. 1 is a perspective view showing the arrangement in the vicinity of the attachment hardware of the metallic belt in one embodiment form of the present invention.

FIG. 1 shows a perspective view of the arrangement in the vicinity of the attachment hardware of a metallic belt in one embodiment form of the present invention.

Referring to this figure, reference numeral 11 denotes a metallic belt attachment plate to which a head carriage is to be attached, as will be detailed hereinafter. This metallic belt attachment plate is formed therein with threaded hole 14. Further, attachment member 13 is joined to one end of metallic belt 12, and formed therein with hole 15, which corresponds to threaded hole 14 in metallic belt attachment plate 11, movable hooking section 16, which is attached to the upper edge section of metallic belt attachment plate 11 and hook 17 which can be adapted with a device for applying tension in the direction of arrow C as shown.

More specifically, attachment member 13, secured to one end of metallic belt 12, has a tongue-like piece at its upper edge section and a second tongue-like piece at the one side edge section, the first tongue-like piece is bent in a U-shape toward metallic belt attachment plate 11 while the second tongue-like piece is bent in an L-shape in a direction opposite to metallic belt attachment plate 11.

Further, metallic belt 12 is curved into a large α-like shape before being securely mounted around the shaft of a motor, and is secured, at the end of which attachment member 13 is not joined, to metallic belt attachment plate 11 and is hooked onto the metallic belt attachment plate 11 by means of hooking section 16 of attachment member 13.

Figure 2A:
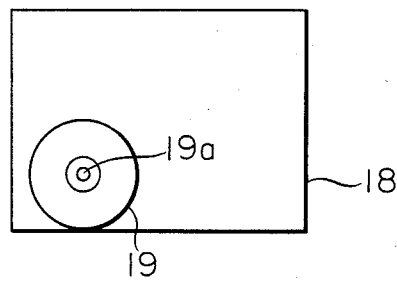
FIGS. 2A to 2C are views showing the method for assembling the carriage drive mechanism section in the above-mentioned embodiment device.
Figure 2B:
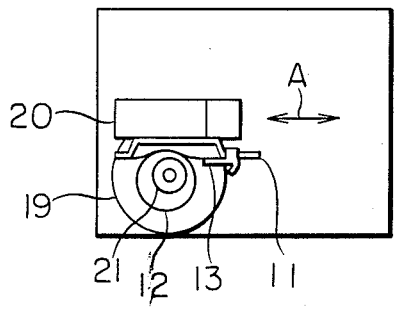
Figure 2C:
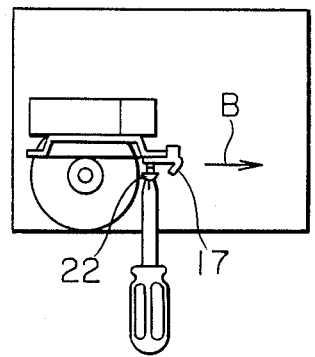
Figure 3A:
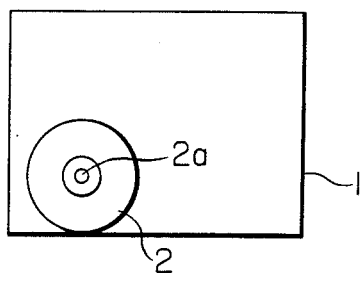
FIGS. 3A to 3D are views showing the method of assembling a carriage drive mechanism section in a conventional apparatus.
Figure 3C:
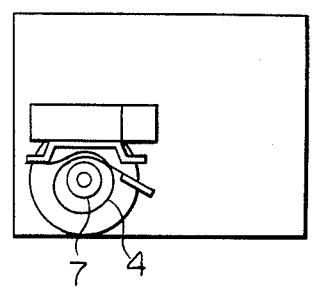
Figure 3B:
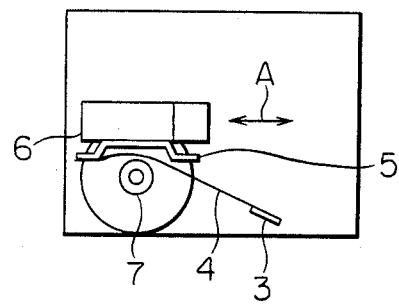
Figure 3D:
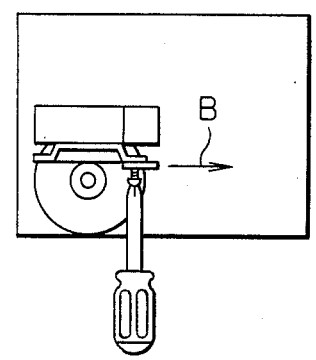
Figure 4:
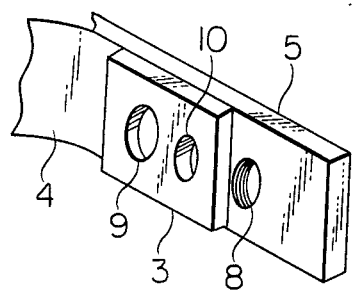
FIG. 4 is a perspective view showing an arrangement in the vicinity of the attachment hardware of a metallic belt in a conventional apparatus.

In FIG. 2A to 2C the reference numerals are attached to the appropriate parts as shown in FIG. 1.

Referring to FIG. 2A, stepping motor 19 is mounted on frame 8 at a predetermined position.

Then in addition to the above, one end of metallic belt 12 to which attachment member 13 is not joined, is secured to metallic belt attachment plate 11, and maintaining this condition, metallic belt 12 is curved into a large α-like shape while hooking section 16 of attachment member 13, attached on other end of metallic belt 12, is fitted onto upper edge section 11a of metallic belt attachment plate 11, so that hooking section 16 rides astride upper edge section 11a.

Further, as shown in FIG. 1, metallic belt attachment plate 11 is formed in its upper edge section 11a with stepped part 11b which prevents hooking section 16 from being displaced in direction D, exceeding a predetermined distance.

Further, as shown in FIG. 2B, metallic belt attachment plate 11 is attached to head carriage 20 while the α-like bent section of metallic belt 12 surrounds pulley 21, which is securely fitted onto shaft 19a of stepping motor 19, and then head carriage 20 is assembled onto frame 18, and is movable in the direction of arrow A.

At the final step, as shown in FIG. 2C, attachment member 13 is pulled in the direction of arrow B after hook 17 of attachment member 13, on one end of the metallic belt 12, is provided with a tension applying device so that hole 15 in attachment member 13 is aligned with threaded hole 14 in metallic belt attachment plate 11, and thereafter, screw 22 is tightened. Thereby attachment member 13 is secured to metallic belt attachment plate 11, while metallic belt 12 is wound around pulley 21.

Thus, in the above-mentioned embodiment form of the present invention, due to the provision of hooking section 16 of attachment member 13, it is possible to temporarily secure metallic belt 12 to metallic belt attachment plate 11 in a condition in which metallic belt 12 is curved in an α-like shape, and therefore, the step of curving metallic belt 12, after head carriage 20 is assembled to frame 18, which has been conventionally required, can be eliminated.

Further, in the above-mentioned embodiment form the step of pulling metallic belt 12 can be simplified since attachment member 13 is provided with hook 17.

With the arrangement of the present invention mentioned above, it is possible, by means of the hooking section 16 of the attachment member 13, to secure the metallic belt 12 temporarily to the metallic belt attachment plate 11 in such a condition that the metallic belt 12 is curved in a large α-like shape, and therefore, the step of curving metallic belt 12 after the head carriage 20 is assembled to the frame can be eliminated. Thereby, the process of winding the metallic belt 12 around the shaft of the motor can be greatly facilitated.

Further, with the preparation of several metallic belts, each temporarily attached to an associated metallic attachment plate, and each curved in a large α-like shape, it is possible to realize automation of the above-mentioned process.

In this case, it is possible to simply attach the tension applying means to the hook of the attachment hardware and therefore, all process steps, including the step of completely securing the metallic belt around the shaft of the motor, can be automated.

What is claimed is:

1. A drive mechanism for a carriage of a disc drive, said mechanism comprising:
   a metal belt having first and second ends attached to said carriage;
   a stepping motor having a shaft, said belt being wound around said shaft to drive said carriage in response to rotational movement of said motor;
   a metal attachment plate affixed to said carriage;
   a metal attachment member affixed to one end of said belt and disposed to attach to said attachment plate; and
   means for fastening said attachment member to said attachment plate,
   wherein said attachment member includes guide means for slidingly engaging with said attachment plate, said attachment member further including means for tensioning said belt.

2. The mechanism of claim 1, wherein said attachment member includes a U-shaped guide portion for slidingly engaging an edge of said attachment plate.

3. The mechanism of claim 2, wherein said attachment member includes an upper edge and said U-shaped member is adjacent said upper edge.

4. The mchanism of claim 1, wherein said metal attachment plate includes an upper section, said section including a stepped section disposed to limit the displacement of said attachment member.

5. The mechanism of claim 1, wherein said fastening means comprises a threaded fastener.

6. The mechanism of claim 1, wherein said attachment member includes a projection from the surface of said attachment member disposed to facilitate tensioning of said belt during assembly of said mechanism.

7. An apparatus for reading or recording data on a recording disc with a transducer, said apparatus comprising:
   means for supporting said transducer;
   means for driving said supporting means to different positions with respect to said recording disc;
   means for transmitting power from said driving means to said supporting means, said transmitting means having a portion slidingly engaged with said supporting means;
   means for slidingly guiding said portion engaged with said supporting means;
   means for tensioning said portion along said guiding means; and
   means for fastening said portion with said tensioning means.

8. The apparatus of claim 7, further including means for limiting the displacement of said portion guided with said guiding means.

9. The apparatus of claim 7, wherein said driving means includes a rotating shaft connected to said transmitting means, said supporting means being driven by rotation of said shaft.

* * * * *